United States Patent Office 3,062,906
Patented Nov. 6, 1962

3,062,906
PREVENTION OF PREMATURE METHANE-OXYGEN REACTION BY USE OF TETRAALKYLLEAD
Walter B. Howard, Texas City, Tex., assignor to Monsanto Chemical Company, St. Louis, Mo., a corporation of Delaware
No Drawing. Filed Mar. 23, 1959, Ser. No. 800,986
4 Claims. (Cl. 260—679)

The present invention relates to an improved process for the production of acetylene. More particularly, it relates to improvements in the process for the production of acetylene by the partial or incomplete combustion of hydrocarbons.

It is well known that acetylene is produced from hydrocarbons by reacting them with a limited amount of oxygen which is insufficient for the complete combustion of the hydrocarbons. In the process, the energy released by combustion of part of the hydrocarbon is used to convert the remaining hydrocarbon to acetylene. In this process, too, some of the energy required is usually supplied from an outside source by preheating the feed gases. This reduces the amount of oxygen required and results in a desirable higher concentration of acetylene because less dilution of the off-gas with carbon oxides occurs. Ordinarily, two methods of preheating are used. In the first, the gases are mixed cold and then heated. Alternatively, they may be preheated separately and then mixed. The gases to be reacted must be mixed under such conditions that they react immediately in the reaction chamber or reaction zone, while on the other hand any interaction in the mixing chamber or mixing zone must be avoided in order to insure continuous operation and high yields. In either or both cases, then, the flame induction time must be such that preignitions or premature reactions do not occur. The flame induction time of a combustible mixture is that length of time that the mixture can exist above its autogenous ignition temperature before ignition takes place. Since preheat temperatures above autogenous ignition temperatures are commonly employed in the art, it is extremely difficult even with great care to control the flame induction time and thus to avoid the occurrence of premature reactions in the mixing step.

It is, therefore, an object of the present invention to overcome these difficulties and provide an improved process for the interaction of hydrocarbons with a limited amount of oxygen.

Another object is to provide a process wherein flame induction times in the preheating and/or mixing steps in a process for the partial combustion of hydrocarbons are lengthened sufficiently to prevent premature reaction or preignitions in the mixing chamber or mixing zone.

These and other objects and advantages which will become apparent from the following description of the invention are accomplished by introducing a small amount of a tetraalkyllead into the hydrocarbon stream to be oxidized prior to mixing it with the preheated oxygen stream in the mixing chamber or zone from which it is subsequently introduced into a reaction chamber or zone. In another embodiment of the invention, the tetraalkyllead is introduced directly into the mixed hydrocarbon and oxygen streams prior to their introduction into the reaction zone. The tetraalkyllead effectively increases the flame induction time of the mixture and thus inhibits preignition. This, in turn, permits the use of higher preheat temperatures and consequently the production of an off-gas higher in acetylene content.

The invention is illustrated in the following example which, however, is not to be construed as limiting it in any manner whatsoever.

Example 1

Flame induction times were determined for a 65–35 vol. percent methane-oxygen mixture (proportions commonly used in acetylene production) and for a similarly proportioned mixture containing a small amount of tetraethyllead. A continuous flow apparatus was employed. Streams of natural gas and oxygen were passed through separate filters, measured through rotameters at 35 p.s.i.g. and 30 p.s.i.g., respectively, and introduced into preheaters consisting of 10 ft. of coiled Nichrome V tubing heated by application of a high current, low voltage source of alternating current across its length. The heated gases were then introduced into opposite sides of a heated tangential mixer where they were quickly and thoroughly mixed. The mixed gases then flowed into an ignition tube, 1-in. in diameter and 35 in. long fitted into the end of the mixer and heated by closely spaced Nichrome wire wrapped along its length. The temperature of the flowing gases was increased slowly until an ignition occurred at the end of the tube and the temperature of the gas at the time of the ignition was recorded. An air quench system consisting of a perforated circular piece of tubing surrounding the circumference at the end of the ignition tube was provided through which high velocity air was discharged to blow off the flame when it appeared. Temperatures were controlled manually by adjusting powerstats and the apparatus was equipped with thermocouples connected to a fast recorder for measuring temperatures. Induction time for the mixture being tested was calculated for the ignition temperature from the volume flow rate and the volume of the tube.

In the test where the tetraethyllead was employed as a flame suppressor it was introduced in fine droplets into the hydrocarbon stream before this stream was heated.

Induction times and other pertinent data for the two systems are presented below.

| Flow Rate, s.c.f.m. | | Vol. Percent Inhibitor | Gas Temp. At Ignition—°C. | Flame Induction Time in Seconds |
|---|---|---|---|---|
| $CH_4$ | $O_2$ | | | |
| 1.998 | 1.075 | None | 852 | 0.083 |
| 1.056 | 0.568 | 0.065 | 852 | 0.157 |

It will be seen that the addition of a small amount of tetraethyllead to the combustible gas mixture almost doubles the flame induction time at a given temperature. While only tetraethyllead is exemplified, other tetraalkyllead compounds such as tetramethyllead, tetrapropyllead, tetrabutyllead, and the like may be satisfactorily substituted.

The amount of tetraalkyllead to be used to effectively inhibit preignition may vary widely depending upon the temperature to which the gas mixture is heated, the composition of the gas, and the geometry of the combustion system employed. In general, amounts in the range from about 0.01 to about 1.0 percent by volume of the gas mixture will prevent premature reaction in the partial oxidation process. Amounts in excess of 1.0% by volume may, of course, be employed and will be effective but are not economically attractive.

What is claimed is:
1. In a process for the production of acetylene by the continuous incomplete combustion of methane with oxygen with the formation of a flame after preheating of the reactants, the improvement which comprises preventing premature reaction in the methane-oxygen mixture by incorporating in said mixture a minor amount of a tetraalkyllead.

2. In a process for the production of acetylene by the continous incomplete combustion of methane with oxygen wherein the methane and oxygen are separately preheated, mixed in a mixing zone, and interacted in a reaction zone with the formation of a flame, the improvement which comprises preventing premature reaction of the methane-oxygen mixture outside the reaction zone by introducing a minor amount of a tetraalkyllead into the methane stream prior to preheating said stream.

3. The process of claim 2 wherein said tetraalkyllead is tetraethyllead.

4. The process of claim 3 wherein the amount of tetraethyllead added is in the range from about 0.01 to about 1.0% by volume of the gas mixture.

References Cited in the file of this patent

UNITED STATES PATENTS

| | | |
|---|---|---|
| 2,727,933 | Evans et al. | Dec. 20, 1955 |
| 2,816,942 | Bills | Dec. 17, 1957 |

OTHER REFERENCES

Broatch et al.: "Fuel," vol. 31, October 1952, pp. 494–6.